United States Patent [19]

Shoji et al.

[11] Patent Number: 4,634,953

[45] Date of Patent: Jan. 6, 1987

[54] ELECTRONIC EQUIPMENT WITH SOLAR CELL

[75] Inventors: Hideyuki Shoji; Kazufumi Usui, both of Tokyo, Japan

[73] Assignee: Casio Computer Co., Ltd., Tokyo, Japan

[21] Appl. No.: 724,528

[22] Filed: Apr. 18, 1985

[30] Foreign Application Priority Data

Apr. 27, 1984 [JP] Japan .......................... 59-61373[U]
Apr. 27, 1984 [JP] Japan .......................... 59-61374[U]

[51] Int. Cl.⁴ ....................... H02J 9/00; G04C 10/02

[52] U.S. Cl. ................................ 320/1; 136/293; 307/64; 368/205

[58] Field of Search .................. 368/204, 205; 320/1; 136/293; 307/64, 66

[56] References Cited

U.S. PATENT DOCUMENTS 3,630,015 12/1971 Lehovec .................... 368/205 X
4,240,021 12/1980 Kashima et al. .................... 320/2
4,328,572 5/1982 Kawahara .................... 368/204
4,350,946 9/1982 Prinze .................... 320/48 X
4,397,563 8/1983 Ichinose .................... 368/204
4,409,538 10/1983 Tabata .................... 368/205 X
4,428,040 1/1984 Yamashiro et al. .................... 368/204 X
4,529,322 7/1985 Ueda .................... 368/204 X

FOREIGN PATENT DOCUMENTS 3035292 3/1982 Fed. Rep. of Germany ........ 320/61
0026089 2/1984 Japan .................... 368/203
2020495 11/1979 United Kingdom .

*Primary Examiner*—R. J. Hickey
*Attorney, Agent, or Firm*—Frishauf, Holtz, Goodman & Woodward

[57] ABSTRACT

An output voltage of a solar cell is supplied to a voltage converter. The voltage converter converts the input voltage into a predetermined voltage, and supplies it to a capacitor. The capacitor is charged by the output current of the voltage converter. The capacitor has a relatively large capacitance. A second voltage converter converts an input voltage from the capacitor into a voltage which is lower than the charged voltage of the capacitor and higher than a minimum operating voltage of a load. The load performs a predetermined operation using the output voltage of the second voltage converter.

20 Claims, 12 Drawing Figures

ELECTRONIC EQUIPMENT WITH SOLAR CELL

BACKGROUND OF THE INVENTION

The present invention relates to an improvement in electronic equipment with a solar cell.

Electronic equipment with a solar cell generally has a secondary cell which is charged by an electromotive force of the solar cell therein. An electronic circuit and other load circuits are operated by using the electromotive force charged in the secondary cell.

A certain type of electronic equipment can only be used in the presence of light. For example, a compact electronic calculator using a liquid crystal display device of a light receiving type is known. In such electronic equipment, the secondary cell is not generally used. A capacitor with a small capacitance for smoothing an output voltage of the solar cell is only connected in parallel with the solar cell. The electromotive force of the solar cell is directly supplied to the electronic equipment.

However, a secondary cell such as a silver oxide cell is generally expensive and requires a large mounting space. For this reason, electronic equipment using a secondary cell is expensive and bulky. In addition, when the secondary cell can no longer be recharged the replacement thereof is cumbersome. Furthermore, an electronic circuit may be damaged by liquid leakage from the secondary cell.

Needless to say, the electronic equipment with a solar cell cannot be used in a dark place since no power is generated. For this reason, a system such as an electronic wristwatch which must be continuously operated regardless of the presence/absence of light cannot comprise an electronic circuit of this configuration. For example, a device such as a compact electronic calculator which is used in a bright place may have a storage unit for storing data such as names, telephone numbers, addresses and the like. In such a device, when no voltage is supplied to the storage unit, data stored therein is erased. Thus, such electronic equipment requires a secondary cell.

SUMMARY OF THE INVENTION

It is an object of the present invention to provide electronic equipment with a solar cell in which a load circuit can be normally operated without a secondary cell, and which can ensure the normal operation of the load circuit even when it is placed in a dark place for a long period of time.

In order to achieve the above object, according to the present invention, there is provided electronic equipment comprising:

a solar cell (E) for generating electrical power in response to light irradiation;

load means (25), for performing a predetermined operation;

capacitor means (C2), connected in parallel with the solar cell, charged by the solar cell (E), the capacitor means being able to be charged to a first voltage higher than a minimum operating voltage at which the load means (25) can be normally operated; and voltage converting means (3), connected to the capacitor means (C2) and said load means (25), for converting the first voltage of the capacitor means (C2) into a second voltage which is lower than the first voltage and is higher than the minimum operating voltage of the load means (25) so as to supply the second voltage to the load means (25) as an operating voltage.

With the above arrangement, the electronic equipment with a solar cell according to the present invention does not require a secondary cell. Therefore, the electronic equipment cannot be damaged by liquid leakage from the secondary cell. The above arrangement results in compact and low cost equipment. Even when the electronic equipment is left in a dark place for a long period of time, its load circuit thereof can be correctly operated.

DETAILED DESCRIPTION OF THE PREFERRED EMBODIMENT

Electronic equipment with a solar cell according to an embodiment of the present invention will be described with reference to the accompanying drawings.

An arrangement of the electronic equipment according to a first embodiment of the present invention will first be described. Note that in the first embodiment, the present invention is applied to an electronic timepiece.

Figure 1:
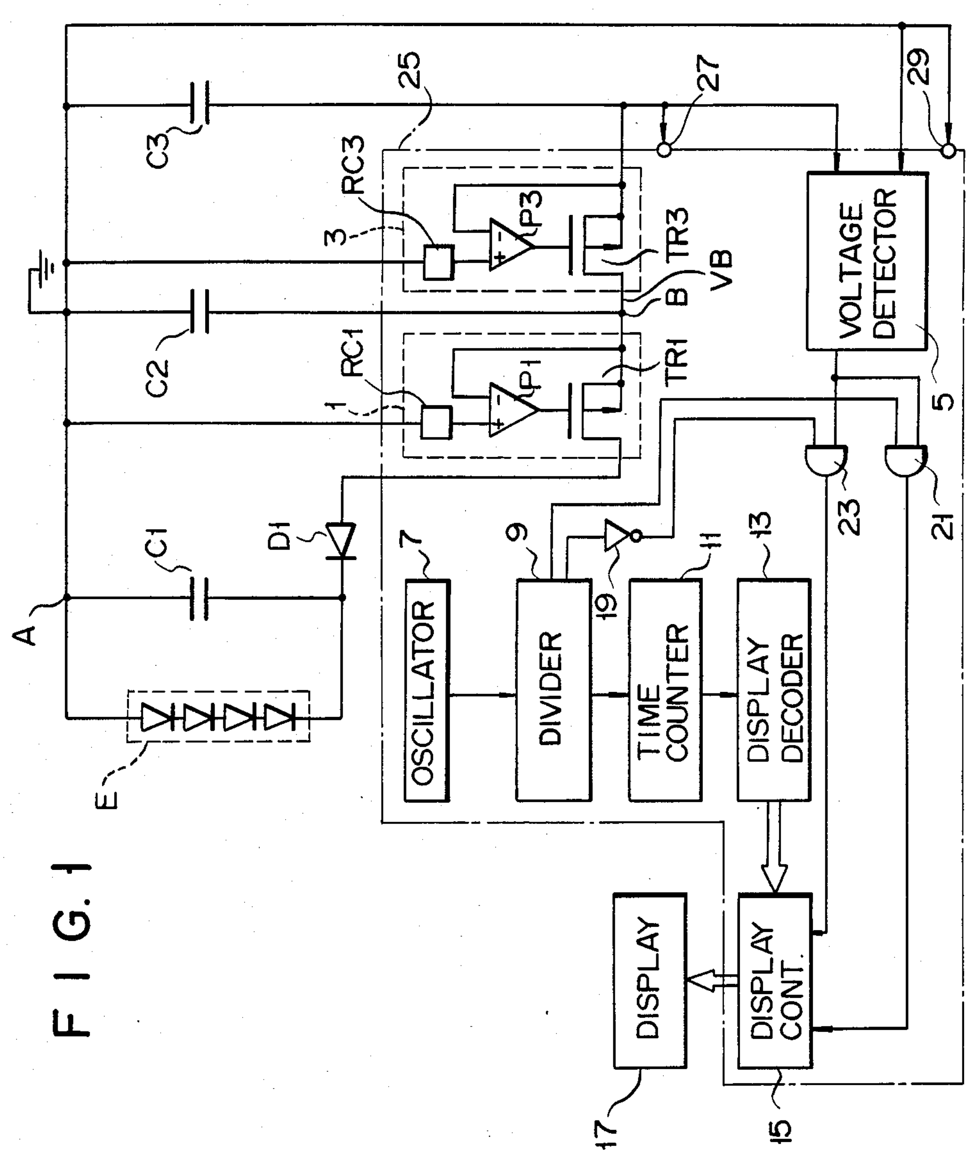
FIG. 1 is a circuit diagram of an electronic wristwatch according to a first embodiment of the present invention.

Referring to FIG. 1, a capacitor C1 is connected in parallel with a solar cell E. The anode of the solar cell E is connected to a ground level. The capacitor C1 is provided for smoothing a voltage generated by the solar cell E. The solar cell E generates a voltage of 1.5 V at an illuminance of 100 lux and a voltage of 3.5 V at an illuminance of 100,000 lux. The capacitance of the capacitor C1 is, e.g., 0.1 μF. The cathode of the solar cell E is connected to the cathode of a diode D1 which is provided for preventing reverse-flow of current. The anode of the diode D1 is connected to a voltage input terminal of a first voltage converter 1.

The converter 1 comprises a p-channel MOS power transistor TR1, an operational amplifier (op amp) P1 and a first reference voltage generator RC1. The anode of the diode D1 is connected to one end of a current path through the power transistor TR1. The gate of the transistor TR1 is connected to the output terminal of the op amp P1. A positive input terminal of the op amp P1 is connected to the output terminal of the generator RC1. The generator RC1 is constituted by, e.g., a Zener diode and a resistor. The generator RC1 generates a constant voltage of −2 V. The input terminal of the generator RC1 is connected to the anode of the solar cell E. The negative input terminal of the op amp P1 is connected to the other end of the current path of the transistor TR1 and a substrate thereof. The other end of the current path of the transistor TR1 serves as the output terminal of the converter 1. A voltage appearing at the other end of the current path of the transistor TR1 is generated as an output voltage of the converter 1. The output terminal of the converter 1 is connected to one electrode of a capacitor C2, the other electrode of which is connected to the anode of the solar cell E. The capacitor C2 is provided for charging/discharging an electromotive force generated from the solar cell E, and has a relatively large capacitance, e.g., 3 F.

A node between the output terminal of the converter 1 and the capacitor C2 is connected to the input terminal of a second voltage converter 3. The converter 3 has substantially the same configuration as that of the converter 1. The converter 3 comprises a p-channel MOS power transistor TR3, an op amp P3 and a second reference voltage generator RC3. The other end of the current path of the transistor TR1 is connected to one end of a current path through the transistor TR3. The gate of the transistor TR3 is connected to the output terminal of the op amp P3. The positive input terminal of the op amp P3 is connected to the output terminal of the generator RC3. An output voltage of the generator RC3 is set at −1.3 V. The input terminal of the generator RC3 is connected to the anode of the solar cell E. The negative input terminal of the op amp P3 is connected to the other end of the current path of the transistor TR3 and a substrate thereof. The other end of the current path of the transistor TR3 serves as an output terminal of the converter 3. A capacitor C3 is connected between the output terminal of the converter 3 and the anode of the solar cell E. The capacitance of the capacitor C3 is, e.g., 0.1 μF. The anode of the solar cell E is connected to the positive input terminal of a voltage detector 5. The output terminal of the converter 3 is connected to the negative input terminal of the detector 5.

The output terminal of an oscillator 7 of the timepiece circuit is connected to the input terminal of a frequency divider 9. The output terminal of the divider 9 is connected to the input terminal of a time counter 11. The output terminal of the counter 11 is connected to the input terminal of a display decoder 13. The output terminal of the decoder 13 is connected to a display controller 15. The output terminal of the controller 15 is connected to a display 17. Note that the display 17 comprises a liquid crystal display unit. A liquid crystal control terminal of the divider 9 is connected to one input terminal of an AND gate 21 and the input terminal of an inverter 19. The output terminal of the inverter 19 is connected to one input terminal of an AND gate 23. The output terminal of the detector 5 is connected to the other input terminal of each of the AND gates 21 and 23. Output terminals of the AND gates 21 and 23 are connected to the controller 15.

An integrated circuit 25 (to be referred to as an LSI for brevity hereinafter) is constituted by the first and second voltage converters 1 and 3, the detector 5, the oscillator 7, the divider 9, the counter 11, the decoder 13, the display controller 15, the inverter 19, and the AND gates 21 and 23. The section constituting the LSI 25 is indicated by an alternate long and short dashed line. The minimum operation voltage of the LSI 25 is 1.1 V. A negative voltage input terminal 27 of the LSI 25 is connected to the output terminal of the converter 3. A positive voltage input terminal 29 of the LSI 25 is connected to the anode (ground level) of the solar cell E. For this reason, an electromotive force is supplied to the LSI 25 through the terminals 27 and 29, and to respective portions of the LSI 25, e.g., the converters 1 and 3 and the oscillator 7. Note that the node between the anode of the solar cell E and the capacitor C2 is given as a node A and the node between the capacitor C2 and the transistors TR1 and TR2 is given as a node B. In addition, a voltage appearing at the node B is given as VB.

Operation of the electronic timepiece according to this embodiment will be described hereinafter.

When light is irradiated on the solar cell E, the solar cell E generates an electromotive force. The output voltage of the solar cell E is smoothed by the capacitor C1, and the smoothed voltage is supplied to the first voltage converter 1.

The op amp P1 compares a voltage (−2 V) generated from the generator RC1 and an output voltage (VB) of the transistor TR1 so as to generate a signal corresponding to a difference between the levels thereof, thereby controlling the ON/OFF operation of the transistor TR1. When a charged voltage (a voltage across two electrodes of the capacitor C2) of the capacitor C2 is 2 V or less (or the voltage VB is higher than −2 V), the op amp P1 generates an L level signal. Thus, the transistor TR1 is switched to the ON (low resistance) state. The converter 1 directly generates the output voltage of the solar cell E. On the other hand, when the charged voltage of the capacitor C2 exceeds 2 V (the voltage VB is lower than −2 V), the op amp P1 generates a signal corresponding to a difference between the levels thereof. Thus, the transistor TR1 is switched to the OFF state. The converter 1 generates a voltage of −2 V. The charging voltage of the capacitor C2 is always kept at 2 V.

Electrical power charged on the capacitor C2 is supplied to the LSI 25 through the second voltage converter 3. As described above, the converter 3 has substantially the same configuration as that of the converter 1. However, a reference voltage generated from the second reference voltage generator RC3 differs from that of the converter 1. For this reason, the op amp P3 compares the reference voltage (−1.3 V) and the output voltage from the transistor TR3. The converter 3 performs ON/OFF control of the transistor TR3. The converter 3 generates a voltage of −1.3 V and the voltage is smoothed by the Capacitor C3. Therefore, a voltage of −1.3 V is always supplied to the LSI 25.

In this manner, when the electrical power is supplied to the LSI 25, the oscillator 7 generates a reference clock signal. The divider 9 divides the clock signal and generates a time clock signal and the like having a predetermined frequency. The time counter 11 counts the clock signal, thereby obtaining the time data, date data and the like. The output data from the counter 11 is supplied to the display controller 15 through the decoder 13. The data is converted into a display drive signal by the controller 15. The display 17 digitally displays the data under the control of the controller 15.

The output voltage from the second voltage converter 3 is also supplied to the detector 5. The detector 5 detects the level of the output voltage of the converter 3. When the absolute value of the output voltage from the converter 3 is equal to or higher than that of a minimum drive voltage of the display 17, the detector 5 generates an H level (logic level 1) signal. Thus, the AND gates 21 and 23 are enabled. The liquid crystal drive signal from the divider 9 is supplied to the controller 15 through the AND gates 21 and 23. In this manner, the display 17 is switched to a display state for displaying data. On the other hand, when the absolute value of the output voltage from the converter 3 is lower than that of the minimum drive voltage of an display 17, the detector 5 generates the L level signal, thereby disabling the AND gates 21 and 23. Therefore, a liquid crystal display signal is not supplied to the controller 15. The display 17 is not in a display state, and degradation of liquid crystal material in the display 17 thus is avoided.

As described above, the circuit of this embodiment includes the capacitor C2 charged by the solar cell E. And the output voltage of the solar cell E is higher than the operating voltage of the load circuit (in this embodiment, the LSI 25), and also includes the voltage converters for converting the voltage of the capacitor C2 into the operating voltage of the load circuit. Therefore, an expensive secondary cell which requires a large mounting space and cumbersome replacement is not needed, and the load circuit can be normally operated.

When the charged voltage of the capacitor C2 (the voltage between two electrodes thereof) is set at 2 V, the capacitance thereof is 3 F, and the minimum operating voltage of the LSI 25 is set at −1.1 V, the LSI 25 can be correctly operated even if no light has been irradiated on the solar cell E for about 40 days. When an output voltage of the voltage converter 3 is set at −1.1 V, the LSI can be operated without irradiating light on the solar cell E for about 46 days. When the converter 3 is not used and a voltage of −2 V from the capacitor C2 is directly supplied to the LSI 25, this electronic equipment can be operated without irradiating light on the solar cell E for about 33 days.

When the capacitance and the charged voltage of the capacitor C2 are changed, the interval during which light need not be irradiated on the solar cell E can be varied. For example, when the capacitance of the capacitor C2 is set at 3 F, the charging voltage (i.e., the output voltage of the voltage converter 1) is set at −2.5 V, and a voltage of 2.5 V is directly supplied to the LSI 25, the timepiece of this embodiment can be properly operated with no light irradiation for 46 days. When the second voltage converter 3 within output voltage of −1.3 V is used, the timepiece can be operated with no light irradiation for 61 days. Alternatively, when the voltage converter 3 within output voltage of −1.1 V is used, the timepiece can be operated with no light irradiation for 72 days.

Even when a capacitor having a small capacitance is used so that the electronic equipment can be arranged in a wristwatch and the like, the present invention can be effective. For example, assume that the capacitance of the capacitor C2 is 0.7 F. When the charging voltage is set at 2.4 V, the output voltage from the converter 3 is set at −1.3 V to −1.45 V, and an average current consumption of the LSI 25 is designed to be about 1.3 μA, the electronic wristwatch can be operated with no light irradiation at least for 5 days. When the capacitance through the capacitor C2 is set at 0.3 F, the wristwatch can be operated with no light irradiation for 2 days. Since the wristwatch is generally worn everyday, even if the capacitance is set at 0.3 F, it is sufficient to be practical.

Figure 2:
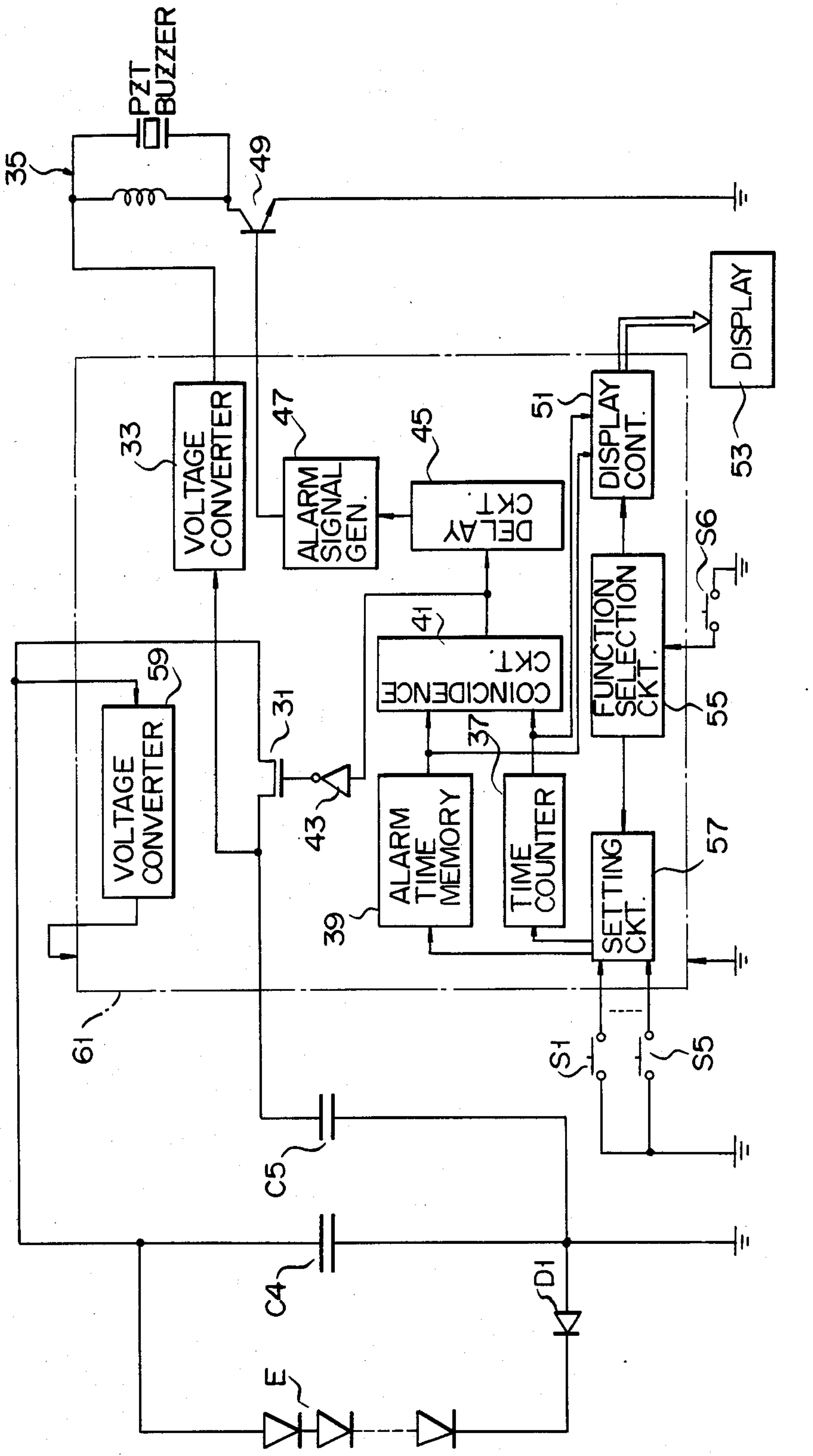
FIG. 2 is a circuit diagram of an electronic wristwatch according to a second embodiment of the present invention.

A second embodiment of the present invention will be described with reference to FIG. 2.

In this embodiment, the present invention is applied to an electronic wristwatch with a solar cell having normal and heavy loads. In this case, the normal load means a load in which the power consumption varies little, and the heavy load means a load in which the power consumption varies widely. Note that the same reference numerals as in FIG. 1 denote the same parts in FIG. 2, and a detailed description thereof is omitted. In this embodiment, a solar cell with a maximum electromotive force of 3.5 V is used.

The cathode of a solar cell E is connected to the cathode of a diode D1. The anode of the diode D1 is connected to one terminal of each of capacitors C4 and C5. The other terminal of the capacitor C4 is connected to the anode of the solar cell E. The other terminal of the capacitor C5 is connected to one end of a current path of a MOS transistor 31. The other end of the current path of the transistor 31 is connected to the anode of the solar cell E. The other terminal of the capacitor C5 is also connected to a voltage converter 33. The output terminal of the converter 33 is connected to a PZT buzzer 35.

Output terminals of a time counter 37 and an alarm time memory 39 which constitute a timepiece circuit are connected to an alarm coincidence circuit 41. The output terminal of the circuit 41 is connected to respective input terminals of an inverter 43 and a delay circuit 45. The output terminal of the delay circuit 45 is connected to an alarm signal generator 47. The output terminal of the generator 47 is connected to the base of a transistor 49. The collector of the transistor 49 is connected to the PZT buzzer 35 and the emitter thereof is connected to a ground level. On the other hand, the output terminals of the time counter 37 and the alarm time memory 39 are also connected to a display controller 51. The output terminal of the controller 51 is connected to a display 53. The input terminal of a function selection circuit 55 is grounded through a switch S6. Output terminals of the circuit 55 are respectively connected to the controller 51 and a setting circuit 57. The setting circuit 57 is connected to a ground level through switches S1 to S5. Furthermore, the output terminals of the circuit 57 are respectively connected to the counter 37 and the memory 39. The other terminal of the capacitor C4 is also connected to a voltage converter 59. An output from the voltage converter 59 is connected to an LSI 61 (to be described later) so as to supply electric power thereto.

The timepiece circuit including, e.g., the transistor 31, the converter 33, the counter 37 and the like is integrally formed as the LSI 61. In FIG. 2, a portion integrally formed as the LSI 61 is indicated by an alternate long and short dashed line.

Figure 3:
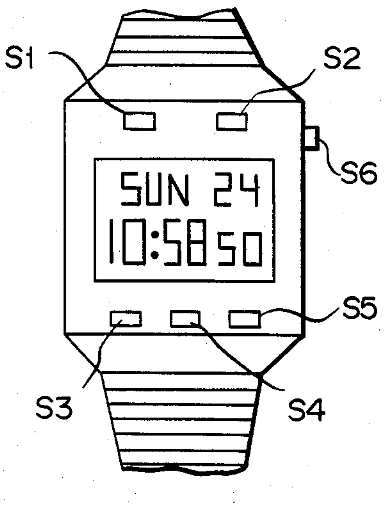
FIGS. 3 and 4 are front views of the electronic wristwatch for explaining respective functions of switches shown in FIG. 2.
Figure 4:
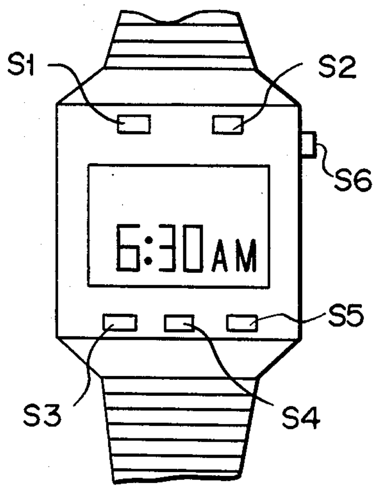

Functions of the correction switches S1 to S5 will be described with reference to FIGS. 3 and 4. Note that in FIGS. 3 and 4, the solar cell E is not illustrated. However, the solar cell E is properly arranged on a case, wristband, display or the like. FIG. 3 shows the display of the electronic wristwatch in a normal mode. Date data "SUN (Sunday), 24" and time data "10:58:50" are displayed. The switches S1 to S5 are provided on an upper surface of the wristwatch. The switches S1 to S5 are provided for respectively correcting a day of the week, date, hour, minute, and second. FIG. 4 shows a display of the wristwatch in an alarm mode. "6:30 AM" is displayed as an alarm generating time. The switches S3 to S5 are provided for correcting hour, minute and the time band (AM/PM).

Operation of the wristwatch according to the second embodiment of the present invention will be described with reference to FIGS. 2 to 4.

The counter 37 counts reference clocks, thereby obtaining time data. The alarm time memory 39 stores preset alarm time data. The normal time data and alarm time data from the counter 37 and the memory 39, respectively, are supplied to the circuit 41. The circuit 41 compares the two data and generates an H level signal upon detecting a coincidence therebetween. When they do not coincide with each other, the circuit 41 generates the L level signal. Except at the alarm time, the output signal from the inverter 43 is at the H level, and the MOS transistor 31 is kept on, since the circuit 41 generates the L level signal. In this mode, the capacitors C4 and C5 are charged by the solar cell E. The voltages charged on the capacitors C4 and C5 are supplied to the voltage converter 59. Thus, the LSI 61 is operated consuming the electrical power on the capacitors C4 and C5.

On the other hand, at the alarm time, the circuit 41 generates the H level signal, and the output signal from the inverter 43 goes to the L level. Therefore, the MOS transistor 31 is turned off, and the power supply from the capacitor C5 to the converter 59 is cut off by the transistor 31. As a result, the output voltage from the capacitor C5 is supplied only to the voltage converter 33. The capacitor C4 is used only for driving the LSI 61, and the capacitor C5 is used only for driving the heavy load (i.e., PZT buzzer 35). After a delay time, for example 10 mS, of the delay circuit 45 has elapsed from the alarm time, a drive signal is generated from the alarm signal generator 47. In response to this, the transistor 49 is energized and the alarm signal generator 47 generates an alarm sound. In other words, after completing the above-mentioned power supply switching operation (i.e., turning off the transistor 31), the PZT buzzer 35 is driven. In this state, a power supply (capacitor C5) for driving the heavy load circuit and that (capacitor C4) for driving the normal load circuit are separated from each other. Therefore, an erroneous operation of the LSI 61 due to a voltage drop by the operation of the PZT buzzer 35 can be avoided.

In this embodiment the PZT buzzer 35 is used as the heavy load circuit. However, the present invention is not liomited to this. For example, the heavy load circuit can be an illumination lamp driving circuit for illuminating a display. Alternatively, in an analog wristwatch, an electronic circuit and a step motor can be separately driven by different capacitors. This embodiment can be applied to compact electronic equipment other than an electronic wristwatch, such as an electronic game, and the like.

Figure 6:
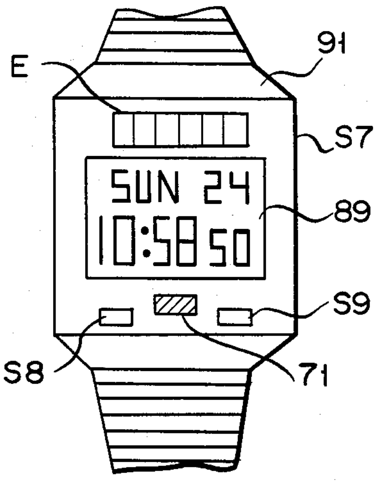
FIG. 6 is a front view of the electronic wristwatch for explaining functions of a light emitting diode and switches shown in FIG. 5.

A third embodiment of the present invention will be described with reference to FIGS. 5 and 6.

The main feature of this embodiment is that a means for preventing overcharging of the capacitor is provided and either the solar cell or a normal dry cell can be selected as a power source as needed.

The anode of a solar cell E is connected to the anode of a light-emitting diode 71. The cathode of the solar cell E is connected to the cathode of the light-emitting diode 71. The diode 71 is provided for preventing overcharging of the capacitor, and has a forward voltage of 3 V. The cathode of the solar cell E is connected to the cathode of a diode D1. The anode of the diode D1 is connected to one contact of a switch S7. The other contact of the switch S7 is connected to one electrode of a capacitor C6. Note that the capacitor C6 has a large capacitance as in the above embodiments. The other electrode of the capacitor C6 is connected to the anode of the solar cell E. Furthermore, the one electrode of the capacitor C6 is also connected to a voltage converter 77. The voltage converter 77 is provided for supplying power to an LSI 75. The output voltage of the converter 77 is supplied to the LSI 75 as an operating voltage. The LSI 75 is provided with the same timepiece circuit as in the above embodiments. The timepiece circuit comprises, e.g., an oscillator 79, a time counter 81, a display control circuit 85, and a switch controller 87. A display 89 and switches S8 and S9 are externally connected to the LSI 75. As shown in FIG. 6, the solar cell E is arranged above the display 89 of a display case 91. Furthermore, the light-emitting diode 71 and the switches S8 and S9 are arranged below the display 89. The switch S7 is provided in a recess of a side surface of the case 91 so as to be located at a position at which it cannot be easily operated as compared to other switches.

In this embodiment, the capacitor C6 is formed to have the same outer shape as that of a normal lithium lead cell. For this reason, the lithium cell L can be stored in a capacitor storing unit (not shown) of the electronic wristwatch instead of the capacitor C6. When the lithium cell L is stored in the storing unit, a user turns off the switch S7. In this case, the lithium cell L serves to supply power to this wristwatch. The output voltage of the lithium cell L (since a positive electrode is grounded, is, e.g., $-3$ V) is supplied to the converter 77. The converter 77 supplies, e.g., a voltage of $-1.3$ V to the LSI 75. When the capacitor C6 is stored in the wristwatch, the user turns on the switch S7. Thus, the electromotive force of the solar cell E serves to charge the capacitor C6 through the switch S7. The output voltage of the capacitor C6 is supplied to the LSI 75 through the converter 77.

When the charged voltage of the capacitor C6 (the voltage between two electrodes thereof) exceeds 3 V, a current flows in the light-emitting diode 71. Thus, the light-emitting diode 71 emits light and signals the user that charging of the capacitor C6 is completed. Since the current flows in the light-emitting diode 71, overcharging of the capacitor C6 can be prevented.

In this embodiment, the user can select either the solar cell or the normal cell as needed. The single light-emitting diode 71 serves as an overcharging prevention circuit and a charging signaling circuit, resulting in a simple structure as compared to a conventional electronic wristwatch.

In this embodiment, the voltage of the lithium cell L and the charged voltage of the capacitor C6 are set at 3 V, but are not limited to this. The charging voltage can be 1.5 V, 2 V or the like. The normal cell is not limited to the lithium lead cell L, but can be any kind of cell.

A fourth embodiment of the present invention will be described hereinafter with reference to FIG. 7.

In the above embodiments, it takes a long time from a state wherein the capacitor C2, C5 or C6 is not charged until the charged voltage of the capacitor reaches a given level, simply by irradiating light onto the solar cell E. For this reason, when the capacitor is not charged at all, even if light is irradiated on the solar cell E, the electronic equipment cannot be used for several minutes. In order to overcome this drawback, in this embodiment, a quick start circuit is provided.

Figure 5:
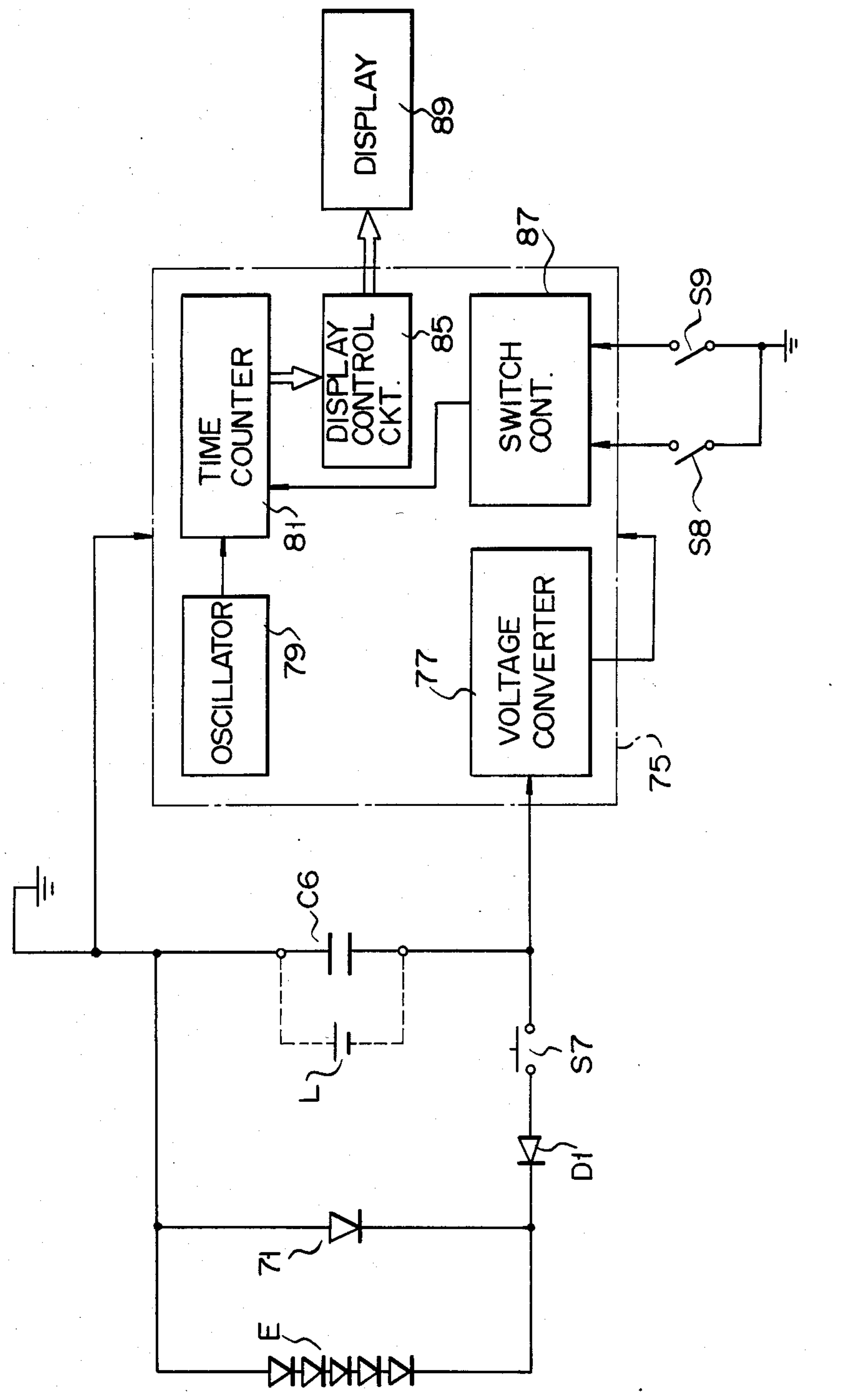
FIG. 5 is a circuit diagram of an electronic wristwatch according to a third embodiment of the present invention.
Figure 7:
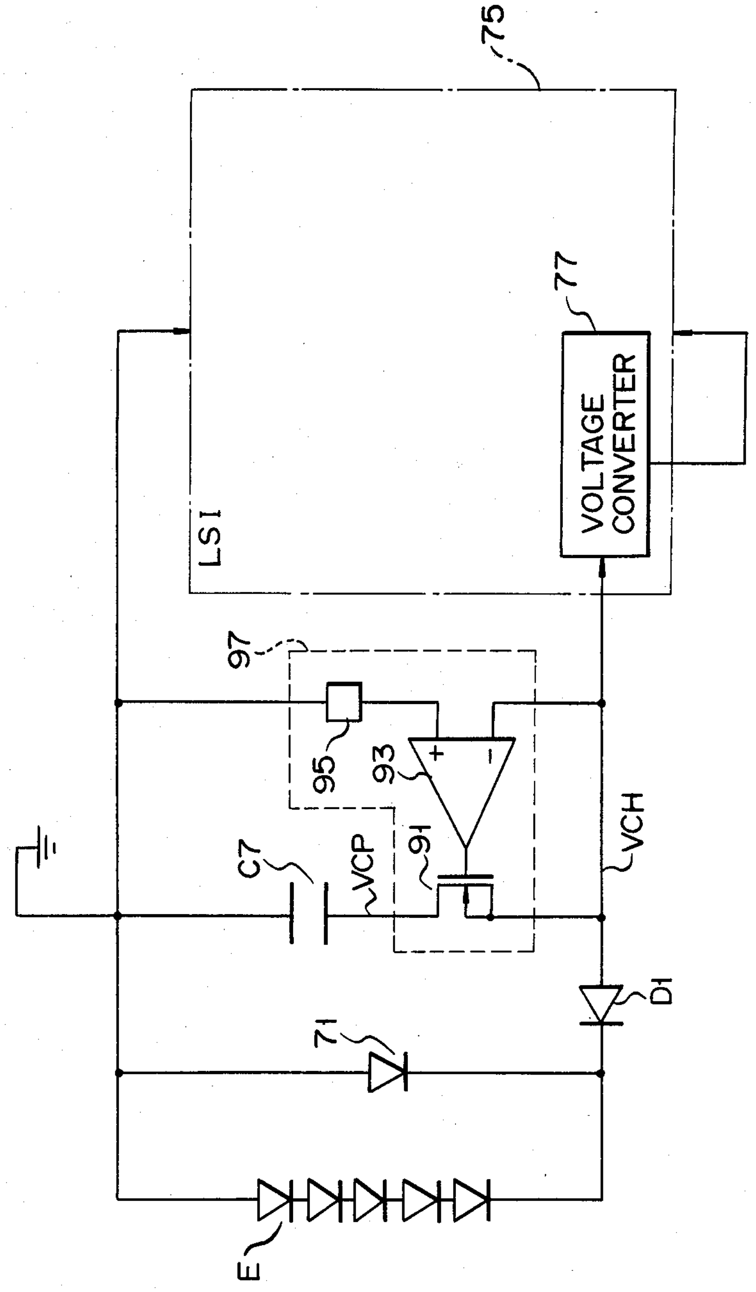
FIG. 7 is a circuit diagram of an electronic wristwatch according to a fourth embodiment of the present invention.

Referring to FIG. 7, since a solar cell E, reverse-flow prevention diode D1 and light-emitting diode 71, an LSI 75, and a voltage converter 77 are the same as those shown in FIG. 5, the same reference numerals as in FIG. 5 denote the same parts in FIG. 7 and a detailed description thereof is omitted.

The diode 71 is connected in parallel with the solar cell E. The cathode of the solar cell E is connected to the cathode of the diode D1. The anode of the diode D1 is connected to one end of a current path through a n-channel MOS transistor 91 and a substrate thereof. The other end of the current path of the transistor 91 is connected to one terminal of a capacitor C7. The other terminal of the capacitor C7 is connected to the anode of the solar cell E. The gate of the transistor 91 is connected to the output terminal of an op amp 93. The positive input terminal of the op amp 93 is connected to the output terminal of a reference voltage generator 95. The input terminal of the generator 95 is connected to the anode of the solar cell E. The negative input terminal of the op amp 93 is connected to the anode of the diode D1. Furthermore, the anode of the diode D1 is connected to the converter 77 of the LSI 75. The converter 77 supplies power to respective portions of the LSI 75. A quick start circuit 97 comprises the transistor 91, the op amp 93 and the generator 95. Assume that a voltage supplied to the converter 77 is given as VCH, a voltage appearing at the node between the capacitor C7 and the transistor 91 is given as VCP, and an output voltage of the generator 95 is given as VRF.

Figure 8A:
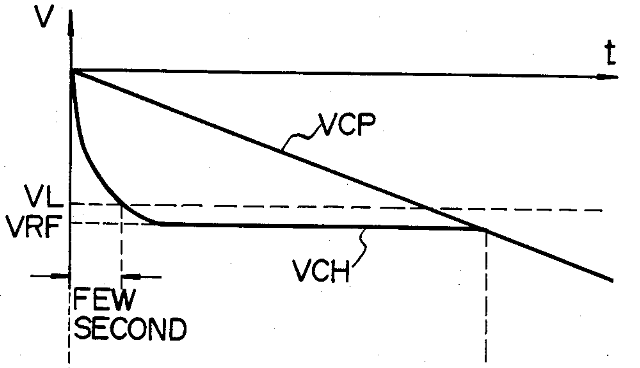
FIGS. 8A and 8B are respectively graphs showing the relationship between voltages of respective portions of the circuit and a transistor shown in FIG. 7.
Figure 8B:
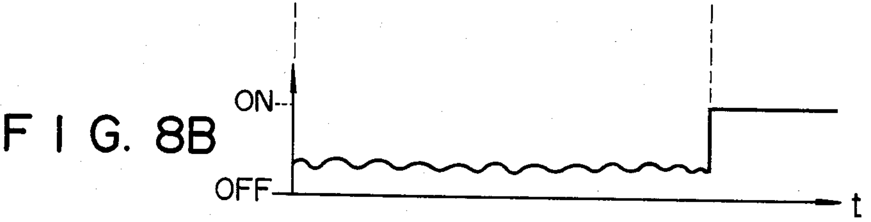

As shown in FIG. 8A, when the solar cell E begins to supply power, an absolute value of the voltage VCH is small. Thus, the op amp 93 generates the L level signal. A resistance between the source and drain of the transistor 91 becomes high (i.e., the transistor 91 is turned off), as shown in FIG. 8B. Therefore, the voltage VCH reaches an operating voltage VL of the LSI 75 for several seconds. The voltage VCH reaches the reference voltage VRF, and thereafter is kept constant. During this interval, the capacitor C7 is gradually charged. An absolute value of the voltage VCP is also gradually increased. When the voltage VCP coincides with the voltage VRF, the transistor 91 is turned on. Thereafter, the capacitor C7 performs a normal charging operation. The absolute values of both the voltages VCH and VCP are increased.

Figure 9:
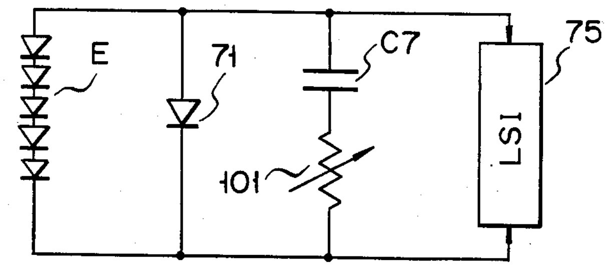
FIG. 9 is a circuit diagram showing another configuration of a quick start circuit shown in FIG. 7.

The quick start circuit can comprise a variable resistor. For example, as shown in FIG. 9, a variable resistor 101 of a maximum resistance of 1 kΩ is connected in series with the capacitor C7. In this case, when this equipment starts operating, the user sets the high resistance.

Figure 10:
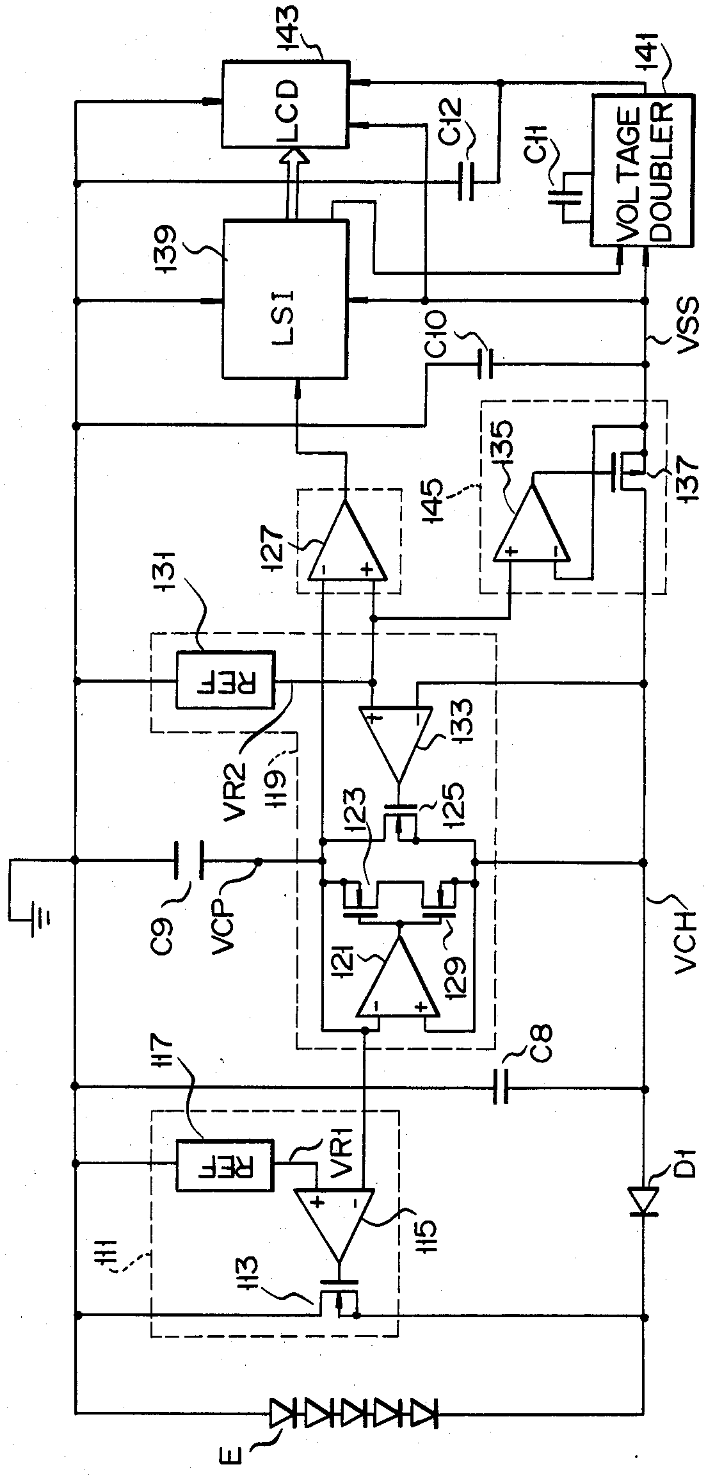
FIG. 10 is a circuit diagram showing an electronic wristwatch according to a fifth embodiment of the present invention.
Figure 11:
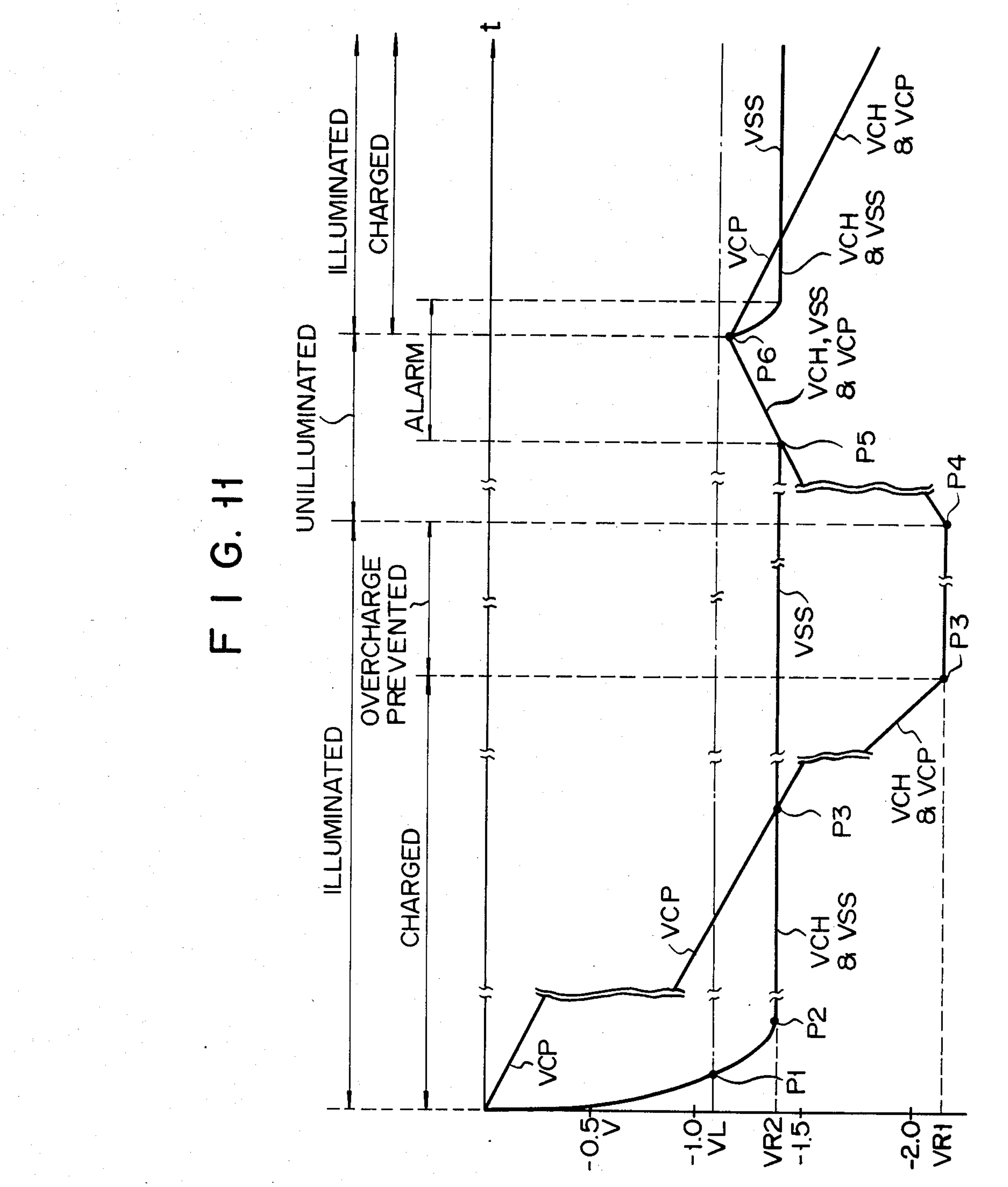
FIG. 11 is a graph showing the relationship between the voltages at respective portions of the circuit shown in FIG. 10.

A fifth embodiment of the present invention will be described with reference to FIGS. 10 and 11.

An arrangement will first be described.

The anode of a solar cell E is connected to one end of a current path through an n-channel MOS transistor 113. The cathode of the cell E is connected to the other end of the current path of the transistor 113 and a substrate thereof. The anode of the cell E is connected to the input terminal of a reference voltage circuit 117. The circuit 117 comprises a Zener diode, MOS transistor and the like. The output terminal of the circuit 117 is connected to the positive input terminal of an op amp 115. The output terminal of the op amp 115 is connected to the gate of the transistor 113. The cathode of the cell E is connected to the cathode of the diode D1. A capacitor C8 is connected between the respective anodes of the cell E and the diode D1.

The anode of the cell E is connected to one electrode of a capacitor C9. The other electrode of the capacitor C9 is connected to the negative input terminals of op amps 115, 121, one end of a current path through and substrate of a MOS transistor 123, one end of a current path through MOS transistor 125 and the negative input terminal of an op amp 127. The output terminal of the op amp 121 is connected to the respective gates of the transistors 123 and 129. The other end of the current path of the transistor 123 is connected to one end of that of the transistor 129. The positive input terminal of the op amp 121, the other end of the current path of the transistor 129 and a substrate thereof, and the other end of the current path of the transistor 125 and a substrate thereof and negative input terminal of the op amp 133 are connected to the anode of the diode D1. The anode of the solar cell E is connected to the input terminal of a reference voltage circuit 131. The output terminal of the circuit 131 is connected to positive input terminals of op amps 127, 133 and 135. The output terminal of the op amp 133 is connected to the gate of a MOS transistor 125. The negative input terminal of the op amp 135 is connected to one end of the current path of the transistor 137 and substrate thereof. The other end of the current path of the transistor 137 is connected to the anode of the diode D1.

A capacitor C10 is connected between the anode of the solar cell E and one end of the current path of the transistor 137. The output terminal of the op amp 127, the anode of the cell E and one end of the current path of the transistor 137 are connected to an LSI 139. A timing output terminal of the LSI 139 and one end of the current path of the transistor 137 are connected to a voltage doubler 141. The voltage doubler 141 comprises capacitors C11 and C12. The output terminal of the voltage doubler 141 is connected to an LCD 143. The LCD 143 is connected to the anode of the cell E, one end of the current path of the transistor 137, and a display output terminal of the LSI 139. A capacitor C12 is connected between the anode of the cell E and the output terminal of the doubler 141.

The op amp 115, the transistor 113, and the reference voltage circuit 117 constitute an excessive charging prevention circuit 111. The op amps 121 and 133, the transistors 123, 125 and 129 and the reference voltage circuit 131 constitute the quick start circuit 119. The op amp 135 and the transistor 137 constitute a voltage converter 145. The op amp 127 serves as a charging signaling controller. Assume that a voltage appearing at the other electrode of the capacitor C9 is given as VCP, a voltage supplied to the converter 145 is given as VCH, and an output voltage thereof is given as VSS.

Operation of the circuit shown in FIG. 10 will be described hereinafter.

The reference voltage circuit 117 generates a reference voltage VR1 of, e.g., −2.2 V. The op amp 115 compares the reference voltage generated from the circuit 117 and a charged voltage of the capacitor C9.

When an absolute value of the voltage VCP between the electrodes of the capacitor C9 exceeds 2.2 V, the op amp 115 turns on the transistor 113. In other words, when the voltage appearing at the other electrode of the capacitor C9 becomes lower than −2.2 V, the transistor 113 is turned on. Since an output current from the cell E flows mainly in the transistor 113, less current is supplied to the capacitor C9. For this reason, overcharging of the capacitor C9 can be prevented.

The op amp 133, the reference voltage circuit 131 and the transistor 125 are operated in the same manner as in the quick start circuit 97 shown in FIG. 7. The op amp 121 and the transistors 123 and 129 are provided for the following reason. When the electromotive force of the cell E is zero and power is supplied to the converter 145 through the transistor 125, the voltage VCH may be decreased to ground level due to noise or a short-circuit with other elements. When the voltage VCH falls to ground level, the output from the op amp 133 goes to the L level, thus turning off the transistor 125. For this reason, power supply from the capacitor C9 to the converter 145 is stopped. In order to prevent this, the op amp 121 is provided in this embodiment. The op amp 121 compares the voltage VCP and the VCH, and when a potential difference is detected, it turns on the transistors 123 and 129. Thus, when the capacitor C9 is already charged, power can be supplied from the capacitor C9 to the converter 145.

When the voltage VCP is lower than a reference voltage VT2 generated from the reference voltage circuit 131 (in this embodiment, −1.3 V), the op amp 127 supplies the L level signal to the LSI 139. The LSI 139 causes the LCD 143 to perform signaling. The operating voltage of the LSI 139 is −1.1 V. The LSI 139 processes the time data and other data and displays them on the LCD 143. Note that the capacitance of the capacitor C10 is, e.g., 0.1 μF. When the output voltage VSS of the converter 145 is abruptly lowered, the capacitor C10 prevents the LSI 139 from being erroneously operated.

A timing signal generated from the timing output terminal of the LSI 139 is supplied to the voltage doubler 141. The doubler 141 increases the output voltage of the converter 145 so as to dynamically drive the LCD 143.

The relationship between the operations of the respective portions of the circuit shown in FIG. 10, voltages and timings will be described with reference to FIG. 11.

Assume that a time at which no charge is stored on the capacitor C9 is given as t=0. When light is irradiated on the solar cell E, the cell E generates a voltage. At this time, an absolute value of the voltage VCH is small. For this reason, the op amp 133 generates the L level signal and the resistance of the transistor 125 becomes high (i.e., it is turned off). In this case, the current flowing in the capacitor C9 is small. Thus, power generated by the cell E is mainly supplied to the voltage converter 145. The voltages VCH and VSS reach the voltage VL (−1.1 V) as a minimum operating voltage of the LSI 139 for several seconds. Therefore, the LSI 139 starts operating several seconds after light is irradiated on the cell E. Thereafter, the voltages VCH and VCP coincide with the reference voltage VR2 and are maintained at this level by means of the quick start circuit 119. During this interval, the capacitor C9 is gradually charged, and the absolute value of the voltage VCP is also gradually increased. Between one and several minutes after the light is irradiated on the cell E, the voltage VCP reaches the same level as that of the voltage VCH (VR2) (indicated by a point P2 in FIG. 11), and the quick start circuit 119 is turned off (the transistor 125 is turned on). Thereafter, the capacitor C9 is further charged and the absolute values of the voltages VCP and VCH are similarly increased. During this interval, since the converter 145 is operated, the voltage VSS is kept at a constant voltage of −1.4 V (VR2). When the voltages VCP and VCH reach the reference voltage of −2.2 V (VR1) (indicated by a point P3 in FIG. 11), the transistor 113 is turned on. For this reason, the voltages VCP and VCH are kept at −2.2 V. In other words, overcharging of the capacitor C9 can be prevented.

Assume that no light is irradiated on the cell E from a point P4. The charges accumulated in the capacitor C9 are gradually discharged, and the absolute values of the voltages VCH and VCP are also gradually decreased. After several days, the absolute values become lower than the reference voltage VR2 (−1.3 V) generated from the reference voltage circuit 131 (P5). Thus, the op amp 127 generates the L level signal. In response to this signal, the LSI 139 causes the LCD 143 to perform signaling display, thereby signaling the user that light must be irradiated on the cell E. Thereafter, the absolute values of the voltages VCH, VSS and VCP are decreased. If the user irradiates light on the cell before these absolute values become lower than the minimum operating voltage, charging can be started (P6). Thereafter, the quick start circuit 119 is operated so as to recover the voltages VCH and VSS quickly.

In this manner, according to the present invention, load circuits can be semipermanently driven.

The present invention is not limited to the above embodiments, and various changes and modifications may be made within the spirit and scope of the present invention. For example, when it is detected that the charged voltage has become lower than a predetermined voltage, the charged voltage of the capacitor C9 can be increased so as to supply the increased voltage to the load circuits.

The application of the present invention is not limited to a wristwatch. For example, the present invention can be applied to any type of electronic equipment with a solar cell such as an electronic game, a radiotelephone system, a camera, an electronic IC card and the like.

What is claimed is:

1. Electronic equipment using a solar energized power source, comprising:

a solar cell for generating electrical power at an output voltage in response to light irradiation;

load means for performing a predetermined operation;

capacitor means, connected in parallel with said solar cell and charged by said solar cell, said capacitor means being capable of charging to a first voltage higher than a minimum operating voltage at which said load means can be normally operated;

voltage converting means, connected to said capacitor means and said load means, for converting the first voltage of said capacitor means into a second voltage which is lower than the first voltage and higher than the minimum operating voltage of said load means, and for supplying the second voltage to said load means as an operating voltage; and quick start means for dividing the output voltage of said solar cell with said capacitor means to supply the first voltage to said voltage converting means when the charged voltage of said capacitor means is lower than the first voltage.

2. Electronic equipment according to claim 1, wherein said load means includes a timepiece circuit.

3. Electronic equipment according to claim 1, including overcharge preventing means, connected to said solar cell and said capacitor means, for preventing excessive charging of said capacitor means when a charged voltage of said capacitor means is equal to or higher than the first voltage.

4. Electronic equipment according to claim 3, wherein said overcharge preventing means is a voltage converter for converting the output voltage from said solar cell into the first voltage so as to supply the first voltage to said capacitor means.

5. Electronic equipment according to claim 3, wherein said overcharge preventing means is a light-emitting diode having substantially the same forward voltage as the first voltage, an anode thereof connected to an anode of said solar cell, and a cathode thereof connected to a cathode of said solar cell.

6. Electronic equipment according to claim 3, wherein said overcharge preventing means comprises a MOS transistor having a current path connected in parallel with said solar cell, and means for comparing the charged voltage of said capacitor means and the first voltage, and for turning on said MOS transistor when the charged voltage becomes higher than the first voltage.

7. Electronic equipment according to claim 1, wherein said voltage converting means is a voltage regulator.

8. Electronic equipment according to claim 1, wherein said capacitor means has a capacitance of at least 0.3 F, and said load means is an electronic wristwatch which is designed to be operable for at least 2 days in a place where no light is irradiated after said capacitor means is fully charged.

9. Electronic equipment according to claim 1, wherein said quick start means has variable resistor means connected in series with said capacitor means.

10. Electronic equipment according to claim 1, wherein said quick start circuit comprises a MOS transistor having a current path connected in series with said capacitor means, and a transistor control circuit for controlling said MOS transistor such that a resistance of the current path is gradually decreased in accordance with an increase in the charged voltage of said capacitor means.

11. Electronic equipment according to claim 1, which further comprises signaling means for detecting that the charged voltage of said capacitor means has become lower than the second voltage so as to signal a detection result.

12. Electronic equipment according to claim 1, wherein said load means comprises increasing means for increasing the second voltage.

13. Electronic equipment according to claim 1, wherein said first load means includes a timepiece circuit, and said second load means is a heavy load circuit controlled by a control signal from said timepiece circuit.

14. Electronic equipment according to claim 1, wherein said first load means and said second load means further comprise switching means for electrically connecting therebetween, and said switching means electrically separates said first load means and said second load means when said second load means is operated.

15. Electronic equipment according to claim 1, wherein the minimum operating voltage of said load means is lower than ½ the charged voltage of said capacitor means, and said quick start means includes means for supplying a voltage higher than the minimum operating voltage to said load means in accordance with the output voltage from said solar cell when the charged voltage of said capacitor means is lower than the minimum operating voltage.

16. Electronic equipment according to claim 15, wherein said quick start means has a resistor element connected in series with said capacitor means.

17. Electronic equipment according to claim 16, wherein said resistor element is a MOS transitor having a current path controlled to have a high resistance when the charged voltage of said capacitor means is low, and to have a low resistance when the charged voltage is high.

18. Electronic equipment according to claim 15, wherein said load means is a timepiece circuit of a wristwatch having a minimum operating voltage of not more than 1.1 V, and said capacitor means has a capacitance large enough to operate said timepiece circuit at least for 5 days without being supplied with an electromotive force from said solar cell after said capacitor means is fully charged.

19. Electronic equipmeht using a solar energized power source, comprising:

a solar cell for generating electrical power at an output voltage in response to light irradiation;

load means for performing a predetermined operation;

first voltage converting means coupled to said solar cell, for converting the output voltage from said solar cell into a first voltage higher than a minimum operating voltage at which said load means can be normally operated;

capacitor means connected with said first voltage converting means and charged by said first voltage, said capacitor means being capable of charging to the first voltage; and second voltage converting means connected to said capacitor means and said load means, for converting the first voltage of said capacitor means into a second voltage which is lower than the first voltage and is higher than the miniumum operating voltage of said load means, and supplying the second voltage to said load means as an operating voltage.

20. Electronic equipment using a solar energized power source, comprising:

a solar cell for generating electrical power in response to light irradiation;

load means including first load means and second load means;

capacitor means including first capacitor means and second capacitor means, connected in parallel with said solar cell; and voltage converting means for converting a voltage from said first capacitor means into an operating voltage, and for supplying the operating voltage to said first load means, said second load means being arranged to be operated from power accumulated by said second capacitor means.

* * * * *